3,562,155
FILTER PRESS
Karl A. Rademacher, Wuppertal-Barmen, and Hans J.
 Heinrich, Ennepetal, Germany, assignors to T. Shriver
 & Company, Inc., Harrison, N.J.
Filed Feb. 25, 1969, Ser. No. 802,179
Claims priority, application Germany, Oct. 23, 1968,
G 6 803 483
Int. Cl. B01d 25/00
U.S. Cl. 210—224                                           9 Claims

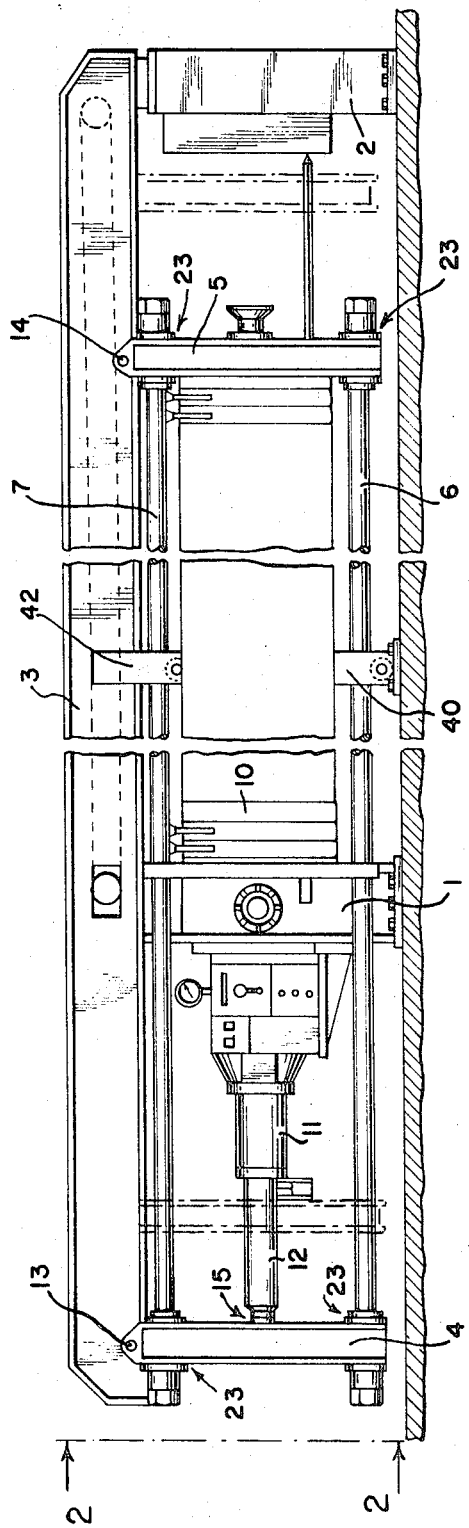

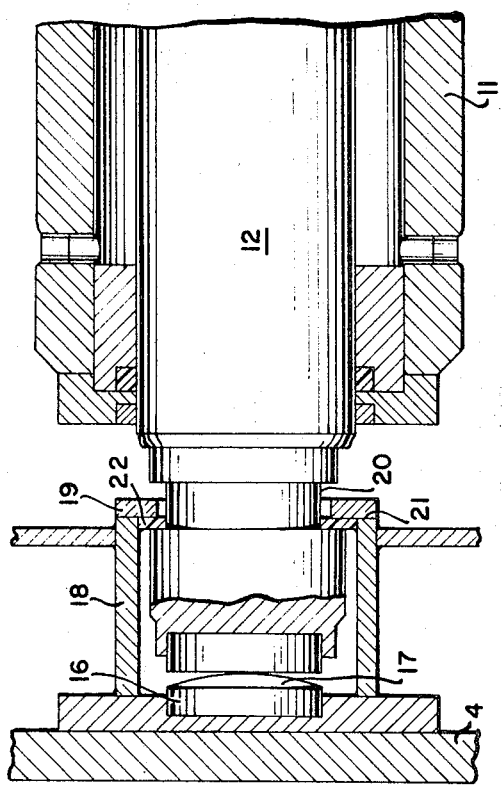
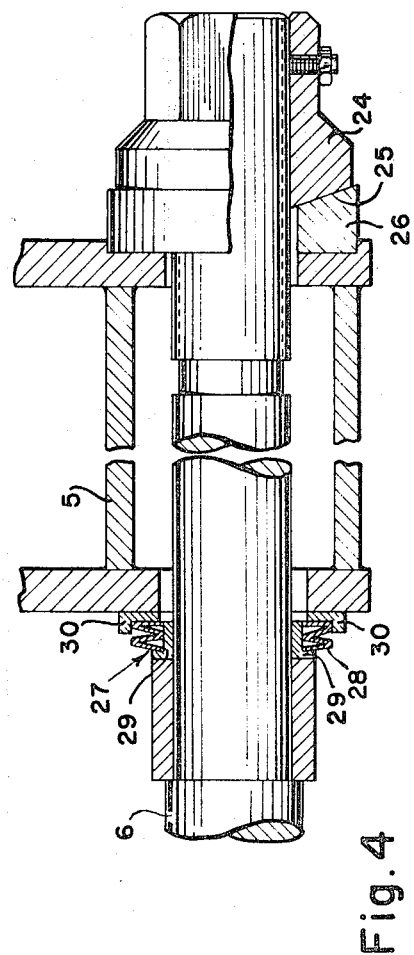
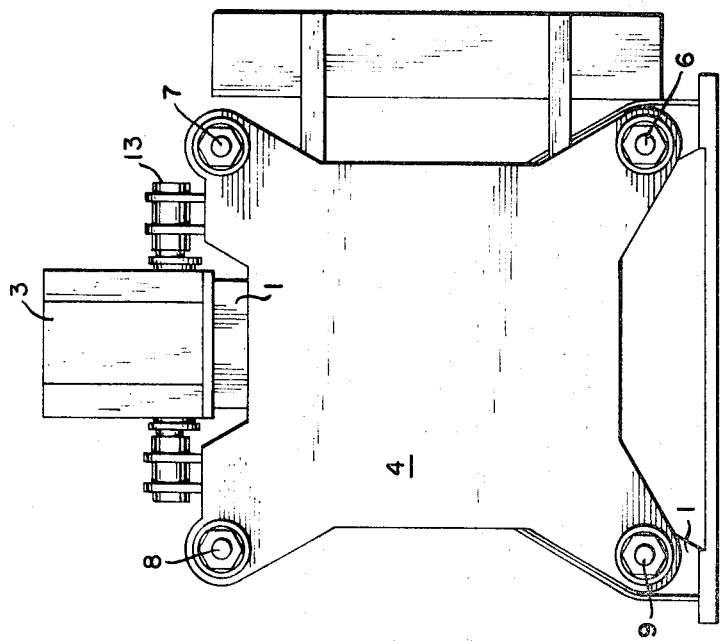

ABSTRACT OF THE DISCLOSURE

A filter press is disclosed which provides for high pressure working of a plurality of filter chambers without breaking the filter press parts, especially the structure forming these chambers. Three links arranged in series between a single cylinder/piston drive unit and a pressure plate, which acts on one end of a series arranged pack of filter plates, provides a very delicate fit between the pressure plates and the pack of filter plates to provide for an avoidance of pressure strains on the plates to prevent them from being broken.

---

The invention relates to filter presses in which there is a horizontally arranged guide carrier supported by a head and an end bracket, whereby compression is provided in the filter press against the head bracket by means of several pull-rods. The pull-rods are connected at one end to a pressure plate and at the other end to a hydraulic drive mechanism, and joints are arranged in the path of the transmission of the compression forces.

Filter presses of the type of the present invention are usually heavy, stationary filters with a plurality of filter chambers, and working at high pressures with them, there is a major problem in avoiding breakage of the machine parts, especially the filter plates in the illustrative embodiment of the invention. Filter plate breakage on compression of the plates is especially to be feared if the plates are tilted as a result of different thicknesses at their opposite edges due, for example, to variable clogging of the filter cloths. In other words, this type of tilting results from the filter pack having different longitudinal dimensions over its cross-sectional area. With pressure plates which can move only in the axial direction, the portions of the plates at the point of the greatest longitudinal dimension of the filter pack are exposed to especially high local pressure forces which can lead to overstraining and breakage of the plates.

In the illustrative embodiment of the present invention, the hydraulic drive mechanism is a cylinder/piston unit, the cylinder being disposed on the side of the head bracket away from the filter plates and the piston acting centrally on a pressure plate to which the pull-rods are connected at their other ends by links, and by having the piston act on the pressure plate by way of a link and by having the pressure plates suspended swinging on a guide carrier. According to the principle of the invention, therefore, three links are arranged one after the other, in series, between the drive mechanism and the pressure plate acting on one end of the filter plate pack in the path of the transmission of the compression force, so that a very delicate fit of the pressure plate to the filter plate pack and an avoidance of local pressure strains are achieved. By the use of only one single cylinder/piston unit as the driving mechanism, in combination with these links, a very uniform distributon of the compression force over the cross-sectional area of the filter plate pack is achieved.

According to further characteristic features of the invention, the joints between the pressure plate and the piston, as well as the links between either pressure plate and the pull-rods comprise two pressure areas which can roll on each other and which, to a certain extent, permit a relative inclination between the two connected parts.

In a particular development of the invention, a crowned pressure area is provided on the pressure plate as countersurface opposite to the front end of the piston and a sleeve surrounding the end of the sleeve, and projecting inward, engages an annular recess in the piston so that, in addition to pressure force, the piston can also exert traction force on the pressure plate. An elastic ring can be placed between the sleeve and the piston which seals the flexible connection.

Finally, according to the invention it can be provided that the pull-rods pass through the pressure plate with room for play and that, at their ends, they carry pressure washers with convex front surfaces which act directly, or by way of spacers, preferably in the form of ball-bearing seats, on the outer surfaces of the pressure plates.

The invention is illustrated below in more detail by means of a preferred form of construction. In the drawings:

FIG. 1 is a side view of a plate filter press according to the invention;

FIG. 2 is a front view of the plate filter press taken from the direction of the arrow II in FIG. 1;

FIG. 3 is an enlarged view of the link connection between the piston and the pressure plate; and FIG. 4 is an enlarged view of the link connection between a pull-rod and one of the pressure plates.

FIG. 1 shows a stationary head bracket 1 and a stationary end-bracket 2 which provide support for a top guide carrier 3. A pressure plate 4 and a pressure plate 5 are connected together by four pull-rods 6, 7, 8 and 9 which are supported movably on rollers at 13 and 14 riding on the tracks on guide carrier 3. Between the head bracket 1 and the pressure plate 5 is the filter plate pack, comprising a plurality of filter plates 10 suspended by a bracket structure which extends upwardly into the guide carrier 3 and supports these filter plates so that they can move and swing. On the side of the head bracket 1 facing away from the filter plates 10 is fixed a hydraulic cylinder 11, whose piston acts centrally on the pressure plate 4. When piston 12 moves from cylinder 11, filter plates 10 are pressed by means of the pressure plate 4, the pull-rods 6, 7, 8 and 9 and the pressure plate 5, so as to compress the plate pack against the head bracket 1.

If there were rigid connections between piston 12, pressure plate 4, pull-rods 6, 7, 8 and 9 and pressure plate 5, pressure plate 5 would constantly maintain its plane parallel to head bracket 1. Then, if the filter plate pack were, for example, a few centimeters thicker on its lower edge than on its upper edge, compression of the filter pack would exert compression force primarily on the lower edge of the filter plate pack, so that the danger of the plate breakage would exist.

This danger is obviated in the form of construction shown by flexibly connecting piston 12 and pressure plate 4 and also by flexibly connecting pull-rods 6, 7, 8 and 9 with pressure plates 4 and 5. The pressure plate 4 and pressure plate 5 are suspended on the guide carrier 3 to swing about axes 13, 14.

The parallel dotted lines shown above the filter plate stack in FIG. 1 is an endless chain assembly which moves the filter plates. For units having relatively long filter plate stacks, the rods 6 tend to sag and support brackets 40 and 42 extend from the floor and guide carrier 3 and provide support for the centers of the rods.

FIG. 3 shows in detail the flexible connection 15 (see FIG. 1) between piston 12 and pressure plate 4. The pressure plate 4 has at its center a pressure washer or contact plate 16 with a convex front surface 17 contacted by a planar front surface of the piston 12. A sleeve 18 is welded to pressure plate 4. This sleeve surrounds the end of piston 12 with room for play and has at its free end a collar or flange 19 which projects inward and engages an annular recess 20 in the piston. An elastic ring 21 in the recess 20 seals the thrust race between the front end of the piston 12 and the pressure washer 16 and acts as a shock absorber between the flange 19 and collar 22 of the piston. When piston 12 moves from cylinder 11, pressure washer 16, as a consequence of the swinging suspension of pressure plate 4 and the flexible connection of pressure plate 4 with the pull-rods, rolls on the front surface of the piston so that pressure plate 4 positions itself obliquely with respect to the front surface of piston 12. When piston 12 is moved into cylinder 11, pressure plate 4 is moved back by way of parts 19, 21 and 22 which come into play.

FIG. 4 shows an enlarged representation of the flexible connection 23 (see FIG. 1) between the pull-rod 6 and pressure plate 5. The flexible connections between each of the other pull-rods and its respective pressure plate either 4 or 5 is constructed in the same way. The pull-rod 6 passes with room for play through a hole bored in pressure plate 5 and has on its outer end a threaded nut 24 having a convex front surface 25 which contacts a coextensive mating surface of a socket ring or brushing 26 which is rigidly mounted on pressure plate 5. Surface 25 and its mating surface on socket ring 26 are annular segments of a sphere so that compressive forces are exerted from rod 6 and nut 24 through the socket ring to pressure plate 5. Furthermore, a firm mating relationship is maintained between those pressure surfaces even when there is a deviation from the right angle relationship between the axis of pull-rod 6 and the central plane of pressure plate 5. Mounted upon the left-hand side of pressure plate 5 and surrounding pull-rod 6 is a resilient flange seal 27 formed by a ring 29 fixed to the pull-rod, a ring 30 fixed to the pressure plate and a spring metal diaphragm seal 28. Diaphragm seal 28 is cupped and is adapted to maintain a satisfactory sealing relationship and yet permit the pull-rod to move horizontally and vertically within the enlarged opening in the side wall of the pressure plate. Hence, when a condition exists which causes the filter pack to be thicker at one edge or corner than elsewhere, the pressure plate moves from its normal perpendicular or 90° position with respect to the axis of the pull-rods so that pressure plate 5 exerts uniform pressure throughout the vertical cross section of the filter pack.

Referring again to FIG. 1, the deviation of pressure plate 5 from the perpendicular or 90° position, as referred to above, causes pressure plate 4 to deviate in a similar manner so that the pressure plates are substantially parallel at all times. Hence, each of the pull-rods maintains a proper working relationship with respect to its corner of each of the pressure plates. Also, referring to FIG. 3, the deviation of pressure plate 4 from its normal perpendicular or 90° relationship merely causes the convex surface 17 of the pressure washer or contact plate 16 to roll slightly on the flat surface of the end of the piston. That maintains the proper force-transmitting relationship between the piston and the pressure plate 4 and the desired balanced pressure forces upon the filter pack. Referring again to FIG. 4, the mating surfaces between nut 24 and socket ring 26 cause pressure plate 5 to move in a controlled manner somewhat as if the end of the pull-rod were swung about a point at the right of FIG. 4 at the axis of the sphere of which surface 25 is a part. That controlled manner of movement insures smooth and uniform movement of the pressure plates at all times. When piston 12 is moved to the right so as to relieve the compression, pressure plate 4 is drawn with it and flange 19 tends to pull pressure plate 4 back to the transverse or 90° position.

The invention contemplates that various types of filter units may be used and that various arrangements may be provided for supporting and moving the components of the filter units. It will also be understood that modifications may be made in the operating structure without deviating from the spirit of the invention.

What is claimed is:

1. A filter press comprising, a frame having a rigidly means, a pair of pressure plates, means for movably and rockably mounting said pressure plates on said guide support means in spaced relation to each other, a plurality of pull rods, means for pivotally connecting the opposed end of said pull rods to respective pressure plates, a plurality of filter plates, means for rockably suspending said filter plates from said guide support means intermediate said head bracket and one of said pressure plates, and the hydraulic drive mechanism including a cylinder-piston unit having its cylinder mounted on the side of said head bracket opposite said filter plates and having its piston engaging the central portion of the other of said pressure plates, said piston and said other pressure plate having interengaging surfaces which are movable with respect to each other whereby said pressure plates and said filter plates are adapted to pivot with respect to each other to maintain uniform pressure on said pressure plates.

2. A filter press as described in claim 1 wherein said horizontal guide support means comprises a track assembly extending longitudinally above said filter units.

3. A filter press as described in claim 1 wherein said filter units are filter plates having a generally rectangular configuration.

4. A filter press as described in claim 1 wherein one of said pressure surfaces is convex and the other is substantially a plane.

5. A filter press as described in claim 4 wherein said other pressure plate has said convex pressure surface thereon, an annular structure surrounding said pressure surfaces and having flange means extending radially inwardly in spaced relationship along the adjacent free end of said piston, said piston having a recess in which said flange means is positioned whereby said other pressure plate is linked to said free end of said piston with limited freedom of movement therebetween.

6. A filter press as described in claim 5 wherein said recess is an annular groove and said flange means is annular, and a resilient ring positioned between said flange and the side wall of said recess.

7. A filter press as described in claim 1 wherein one end of each of said pull-rods is mounted in an opening through a pressure plate and which includes resilient interconnecting means between said end and said pressure plate which comprises, means rigidly mounted upon the free end of said pull-rod and presenting an annular surface which is substantially a segment of a sphere and which constitutes a bearing pressure surface exposed generally toward said pressure plate, and means mounted upon said pressure plate and presenting a pressure surface which mates with said annular surface to transmit compressive forces between said end of said pull-rod and said pressure plate and to permit said pressure plate limited freedom of movement from a position where its central plane is transverse to the axis of said pull rod.

8. A filter press as described in claim 7 which includes a resilient annular seal mounted upon the side of said pressure plate opposite said free end of said pull rod and surrounding said pull rod and permitting limited angular movement between the axis of said pull rod and said pressure plate.

9. A filter press as described in claim 7 wherein said pull rods are positioned with their axes parallel to the axes of said piston and radially spaced outwardly with respect to said filter plates whereby said compressive forces are transmitted from said hydraulic drive mechanism along the sides of said filter plates to the first mentioned pressure plate.

References Cited

UNITED STATES PATENTS

| | | | |
|---|---|---|---|
| 1,749,080 | 3/1930 | Mathers | 210—224 |
| 2,503,659 | 4/1950 | Curtis | 254—93 |
| 2,752,801 | 7/1956 | Olson | 254—93X |
| 3,241,816 | 3/1966 | Nouel | 254—93 |
| 3,342,456 | 9/1967 | Nouel | 254—93 |

REUBEN FRIEDMAN, Primary Examiner

T. A. GRANGER, Assistant Examiner